(12) United States Patent
Tsitron

(10) Patent No.: US 11,316,962 B2
(45) Date of Patent: Apr. 26, 2022

(54) ATTACHABLE FOLDING HANDLE FOR HOLDING MOBILE DEVICES WITH USERS FINGERS

(71) Applicant: Ilya Tsitron, Bushkill, PA (US)

(72) Inventor: Ilya Tsitron, Bushkill, PA (US)

( * ) Notice: Subject to any disclaimer, the term of this patent is extended or adjusted under 35 U.S.C. 154(b) by 106 days.

(21) Appl. No.: 16/669,468

(22) Filed: Oct. 30, 2019

(65) Prior Publication Data

US 2020/0344343 A1 Oct. 29, 2020

Related U.S. Application Data

(63) Continuation-in-part of application No. 16/208,986, filed on Dec. 4, 2018, now abandoned.

(51) Int. Cl.
| | |
|---|---|
| H04M 1/00 | (2006.01) |
| H04M 1/04 | (2006.01) |
| F16M 13/02 | (2006.01) |
| F16M 11/10 | (2006.01) |
| F16M 11/38 | (2006.01) |
| G06F 1/16 | (2006.01) |

(52) U.S. Cl.
CPC .............. *H04M 1/04* (2013.01); *F16M 11/10* (2013.01); *F16M 11/38* (2013.01); *F16M 13/022* (2013.01); *G06F 1/1626* (2013.01)

(58) Field of Classification Search
CPC ....... H04M 1/04; G06F 1/1632; H05K 5/0204
See application file for complete search history.

(56) References Cited

U.S. PATENT DOCUMENTS

| 8,622,447 | B1* | 1/2014 | Wirtz | F16M 13/00 294/25 |
|---|---|---|---|---|
| 2016/0183393 | A1* | 6/2016 | Groom | B62B 9/26 280/33.992 |
| 2016/0192752 | A1* | 7/2016 | Lach | H04B 1/3888 206/45.2 |
| 2017/0135234 | A1* | 5/2017 | Kim | E05D 11/0054 |
| 2017/0324852 | A1* | 11/2017 | Sadai | H04M 1/0281 |
| 2018/0332153 | A1* | 11/2018 | Brown | H04M 1/04 |

* cited by examiner

*Primary Examiner* — Pakee Fang

(57) ABSTRACT

A handle for holding a mobile device with at least one finger has a first element attachable to a back of the mobile device, and a second element pivotally connected to the first element for pivoting around a pivot axis extending in an axial direction, the second element includes at least two branches spaced from one another in a direction which is parallel to the axial direction and each having a finger receiving opening, in a folded position of the first and second elements the second element extends along the back of the mobile device, while in a pivoted away position of the second element relative to the first element the first and second elements are located at an angle relative to one another, and each of the branches of the second elements has a first portion located closer to the pivot axis and a second portion located farther from the pivot axis and formed so that when a finger of a user is introduced into the finger receiving opening of any of the branches it is surrounded by the first portion of said branch which is located closer to the pivot axis and the second portion of the branch which is located farther from the pivot axis correspondingly from two sides.

7 Claims, 9 Drawing Sheets

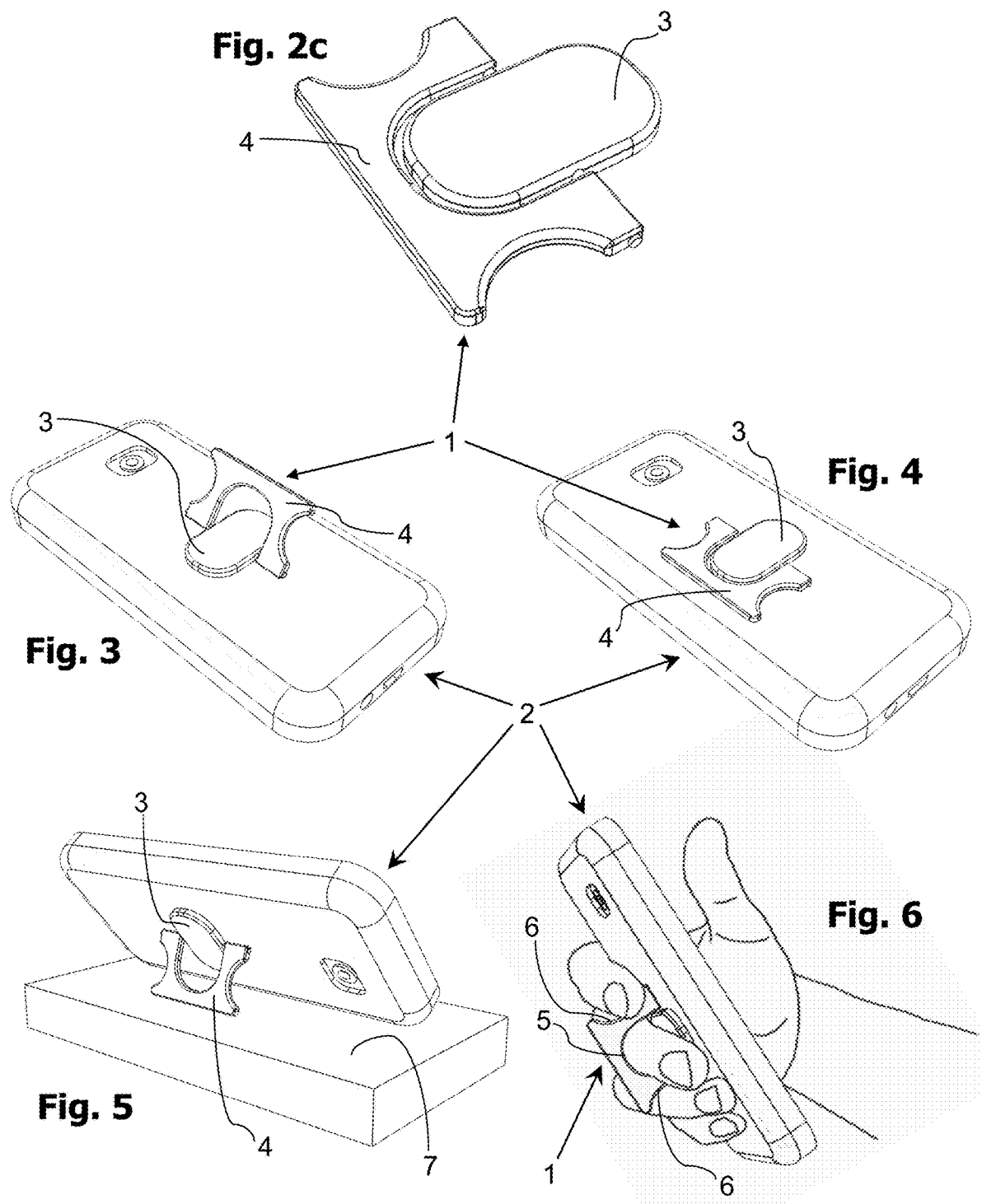

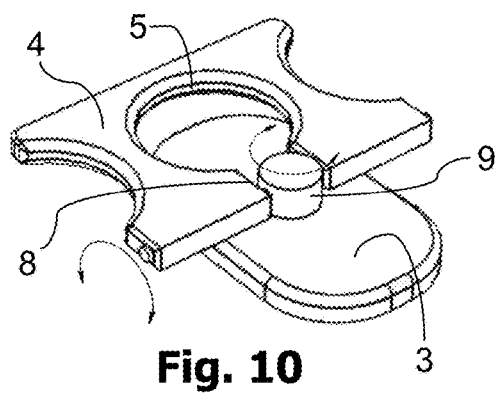
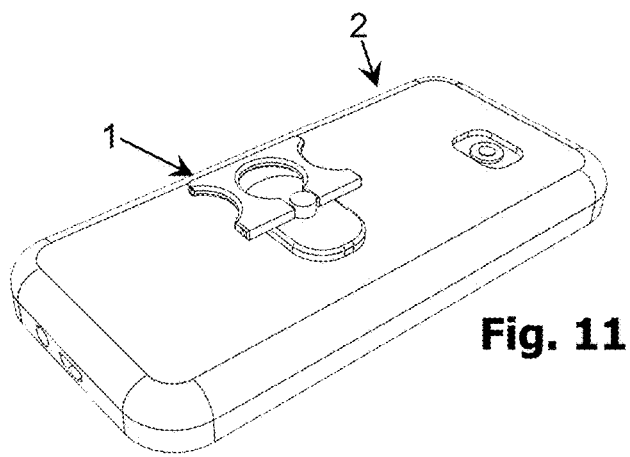
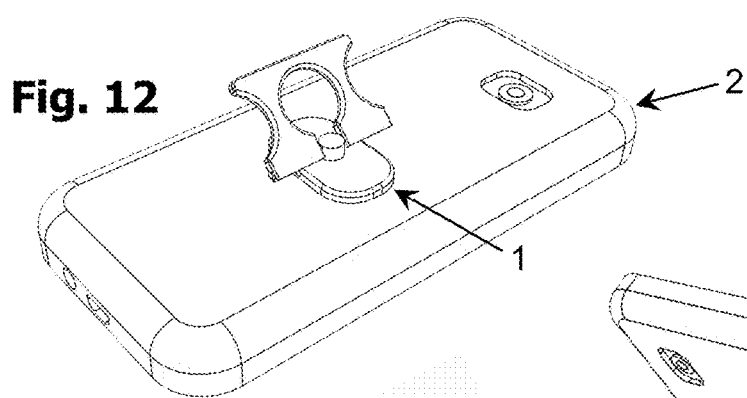
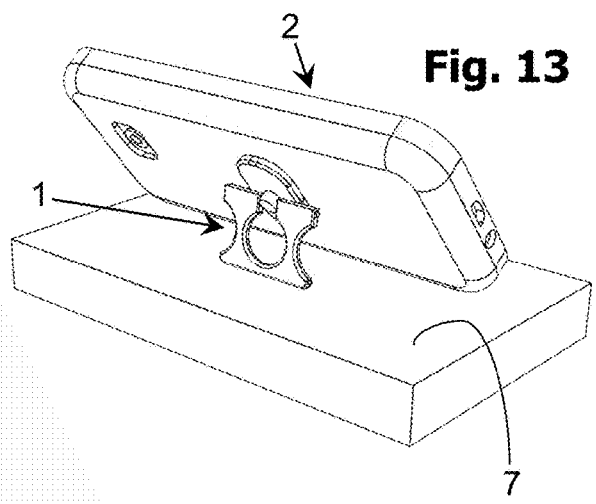
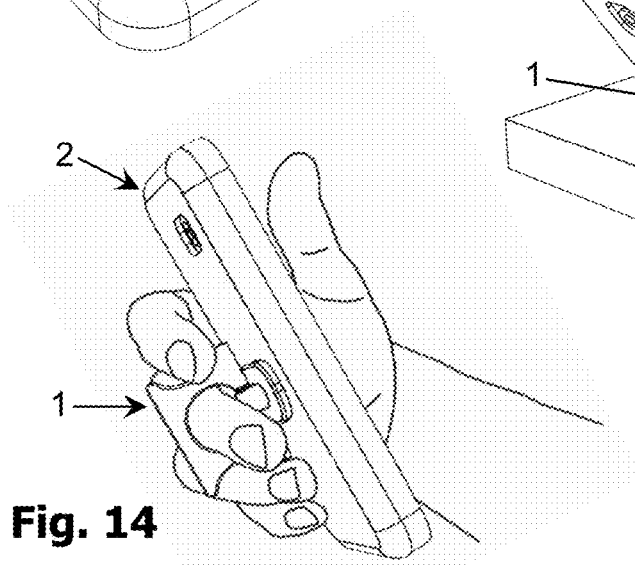

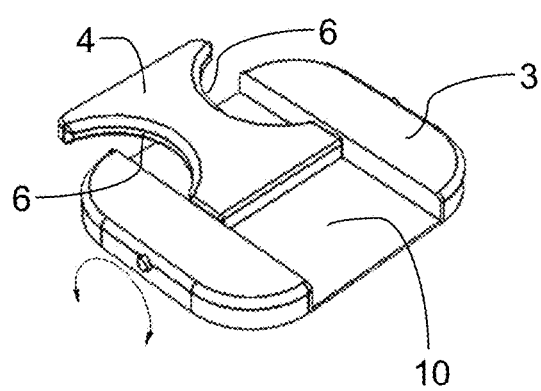
Fig. 15
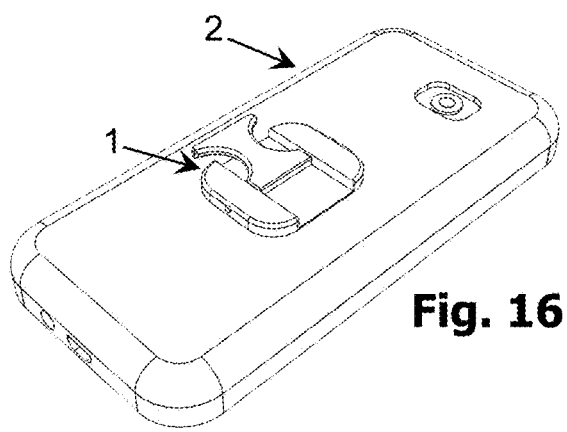
Fig. 16
Fig. 17
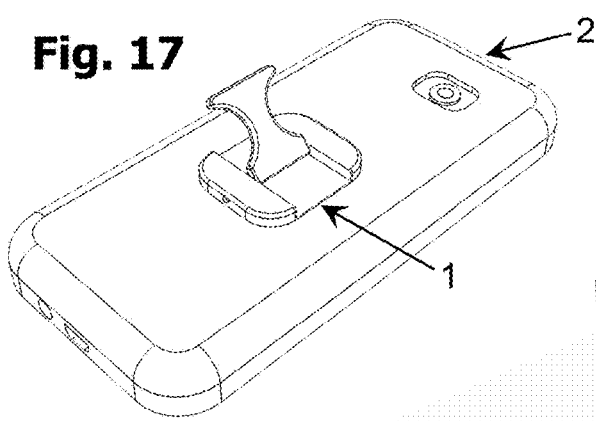
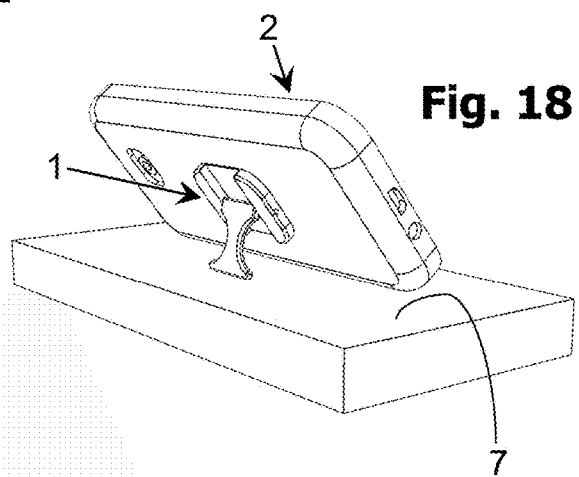
Fig. 18
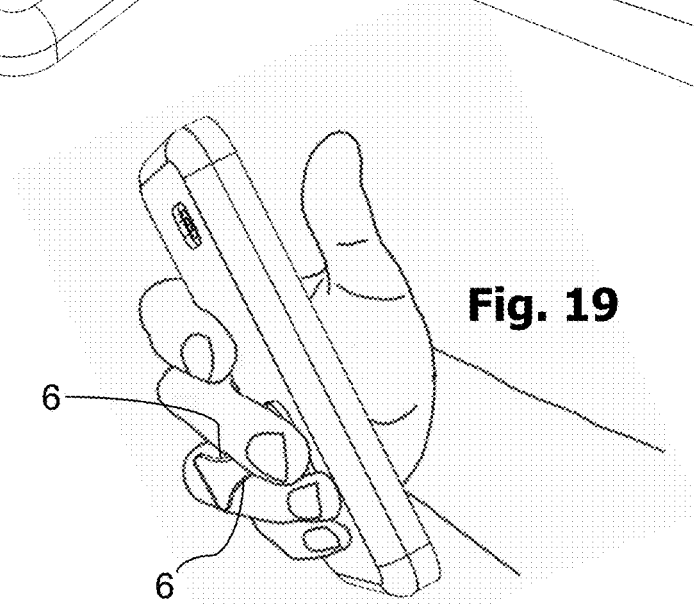
Fig. 19

ATTACHABLE FOLDING HANDLE FOR HOLDING MOBILE DEVICES WITH USERS FINGERS

CROSS-REFERENCE TO A RELATED APPLICATION

This patent application is a continuation-in-part of U.S. patent application Ser. No. 16/208,986 which was filed on Dec. 4, 2018, from which the present application claims its priority, and whose content is fully incorporated in the present patent application

BACKGROUND OF THE INVENTION

The present invention relates to handles for holding mobile devices, such as cellular telephones and the like.

Holding devices of this type are known in the art. One of such holding devices is disclosed for example in U.S. Patent Publication Ser. No. 2018/0332153 to Brown. The Brown reference discloses a handle 100 with a ring 104 which is connected by a hinge 120 to an electronic device. The ring 104 has two branches 106 and 108 that are spaced from each other in a direction which is parallel to an axial direction, have finger receiving openings, and can be engaged by fingers of a user in order to hold an electronic device 102. Each of the branches 106 and 108 however does not have two portions which are located correspondingly closer to a pivot axis and farther from the pivot axis so that when a finger of a user is introduced into a side supporting opening it is partially surrounded from two sides by one portion located closer to the pivot axis and by another portion located farther from the pivot axis. Each of the branches 106 and 108 has only one such portion. As a result, the holding of the device by such a handle cannot be reliable or comfortable.

SUMMARY OF THE INVENTION

Accordingly, it is an object of the present invention to provide a handle for holding mobile devices, such as cellular telephones and the like, which is a further improvement of the existing holding devices of this type.

In keeping with these objects and with others which will become apparent hereinafter, one feature of the present invention resides, briefly stated, in a handle for holding a mobile device with at least one finger, comprising a first element attachable to a back of the mobile device; and a second element pivotally connected to the first element for pivoting around a pivot axis extending in an axial direction, wherein said second element includes at least two branches spaced from one another in a direction which is parallel to the axial direction and each having a finger receiving opening, wherein in a folded position of the first and second elements the second element extends along the back of the mobile device, while in a pivoted away position of the second element relative to the first element the first and second elements are located at an angle relative to one another, wherein each of the branches of the second elements having a first portion located closer to the pivot axis and a second portion located farther from the pivot axis and formed so that when a finger of a user is introduced into said finger receiving opening of any of said branches it is surrounded by said first portion of said branch which is located closer to the pivot axis and by said second portion of said branch which is located farther from said pivot axis.

When the handle for holding a mobile device is designed according to the present invention, its engagement by at least one or two fingers of the user is much more reliable because each finger introduced in the receiving opening of each branch of the second element is surrounded by two portions of each branch from both sides, and as a result the holding of the mobile device as a whole is more reliable as well, allowing the user to reliably and comfortably control the angle and position of the mobile device in the hand of the user with an ability to operate the mobile device with only one hand.

According to another feature of the present invention, the handle for holding a mobile device further comprises means for attaching the first element to the back of the mobile device and selected from the group consisting of adhesive means, screws, and bolts.

According to a further feature of the present invention the handle for holding a mobile device further comprises means for pivotally connecting the second element to the first element so that the second element can be pivoted relative to the first element between a plurality of relative positions and retained immovably in each of the positions allowing the handle for holding a mobile device to keep the mobile device placed on a horizontal surface at an angle relative to the surface.

According to a further feature of the present invention in the handle for holding a mobile device said means for pivotally connecting the second element to the first element has a main portion formed as a pin inserted in one of the elements and a bent end portion inserted in the other of the elements.

According a further feature of the present invention in the handle for holding a mobile device each of the receiving openings provided in each of said branches of said second element has a substantially semi-circular shape.

According to a further feature of the present invention, the second element is provided with at least one hole for receiving an additional object selected from the group consisting of a suspending member or a decorative member.

The novel features of the present invention are set forth in particular in the appended claims. The invention itself however both as to its construction and its manner of operation will be best understood from the following description of the preferred embodiments which is accompanied by the following drawings.

BRIEF DESCRIPTION OF THE DRAWINGS

FIG. 2 is a view showing a handle for holding the mobile device according to the present invention, but on a scale of the known handle shown in FIG. 1a;

FIGS. 2b-6 of the drawings are views showing the handle for holding mobile devices, according to a first embodiment of the present invention, FIGS. 7-9 of the drawings are views showing the handle for holding mobile devices, according to further embodiments of the present invention;

FIGS. 10-14 of the drawings are views showing the handle for holding mobile devices, with different examples of attachment of the handle according to the present invention;

FIGS. 15-19 of the drawings are views showing the handle for holding mobile devices, which can be held by only two fingers according to the present invention;

DESCRIPTION OF THE PREFERRED EMBODIMENTS

Figure 1:
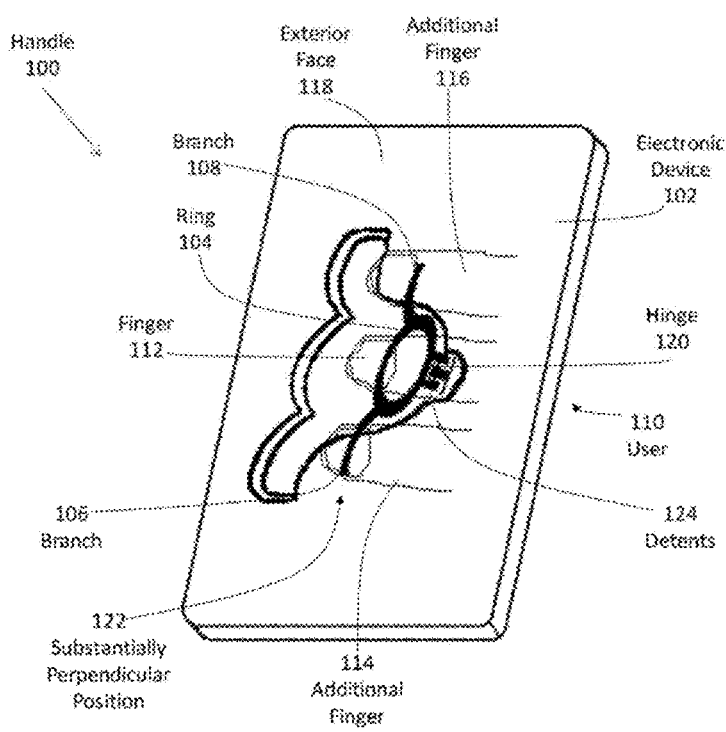
FIG. 1 of the drawings is a perspective view showing a previously known handle for holding a mobile device and the mobile device to which it is attached.
Figure 1A:
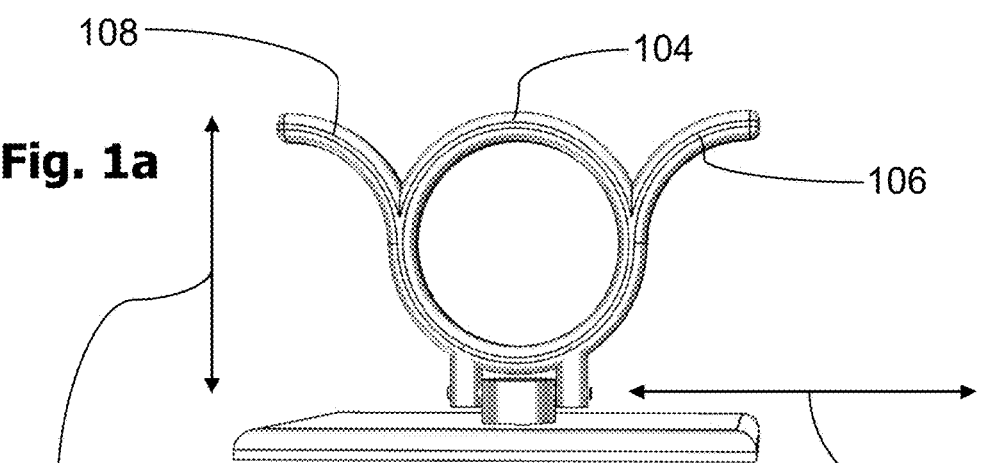
FIG. 1a is a view substantially corresponding to the view of FIG. 1, but showing the handle for holding the mobile device located perpendicular to the mobile device.
Figure 1B:
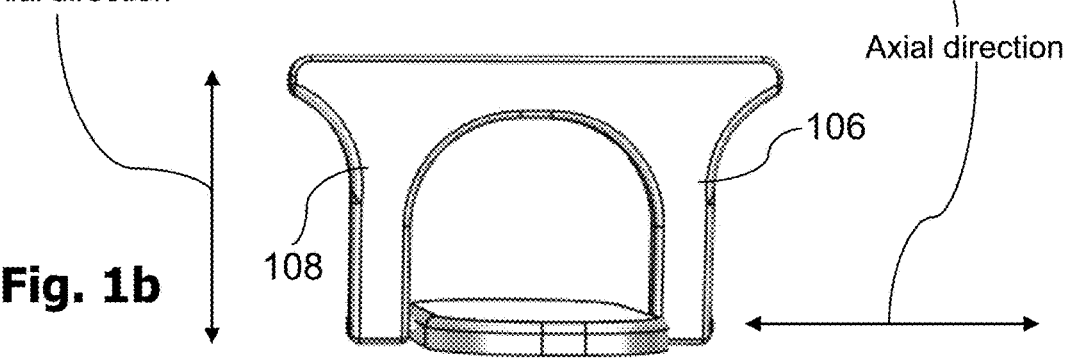
FIG. 1b is a view substantially corresponding to the view of FIG. 1a, but showing the handle for holding the mobile device located perpendicular to the mobile device and also formed on a scale of a handle according to the present invention.

A handle 1 according to the present invention shown in FIGS. 2-6 is used for holding a mobile device 2. It has a first element 3 attachable to a back of the mobile device 2, and a second element 4 pivotally connected to the first element 3. In the embodiment shown in FIG. 2b the second element 4 has three finger receiving openings for fingers, with one central finger receiving opening 5 and two side finger receiving openings 6 located at both sides of the latter.

The second element 4 has two branches 4' and 4" which are spaced from each other in a direction that is parallel to an axial direction. The two side finger receiving openings 6 are offset from a center of the central finger receiving opening 5 in opposite directions and located at opposite axial sides of the second element 4. Each of the branches 4' and 4" has a first portion 4a located closer to a pivot axis Pa and a second portion 4b located farther from the pivot axis Pa. As a result, when a finger of a user is introduced into each of the side finger receiving openings 6 it is surrounded by the first portion 4a of the branch, which first portion 4a is closer to the pivot axis Pa, and also by the second portion 4b of the same branch, which second portion 4b is father from the pivot axis Pa, from two sides as seen in a direction which is transverse to the axial direction. This provides for a reliable hold of the handle and as a result for a reliable hold of the mobile device. It is also important that the first portion 4a of each of the branches 4' and 4" allows a finger of a user inserted into each of the side finger receiving openings 6 to be at a distance from the pivot axis Pa and from mobile device 2.

In operation one finger of the user can extend through the central supporting opening 5 and two fingers of the user can extend through two side finger receiving openings 6 as shown in FIG. 6, or only two fingers of the user can extend through two side finger receiving openings 6.

Figure 2:
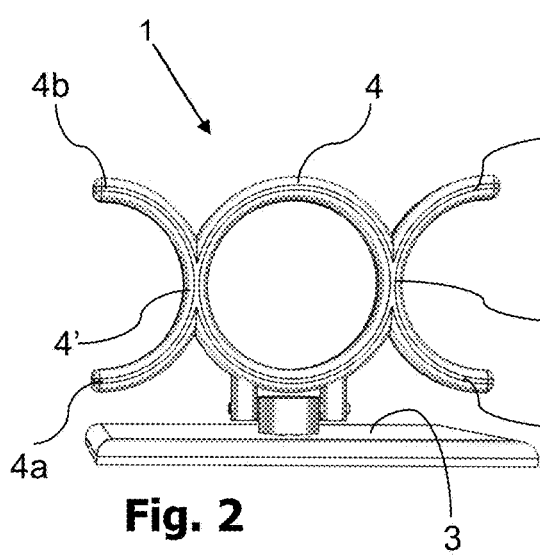
Figure 2A:
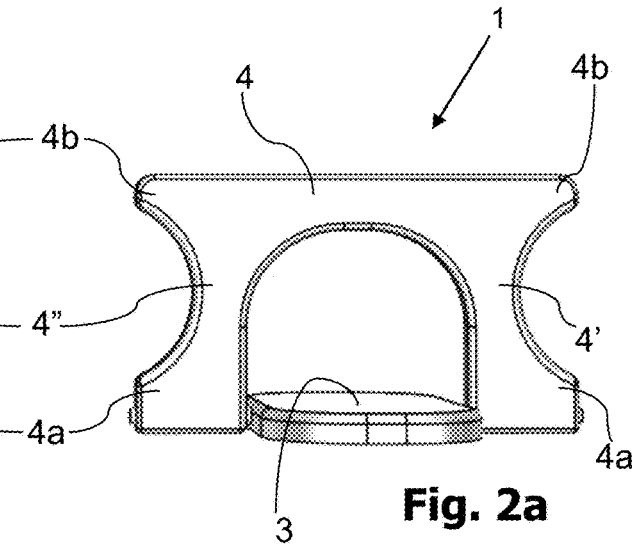
FIG. 2a is a view showing a handle for holding the mobile device according to the present invention in a position corresponding to the position of the known handle for holding the mobile device shown in FIG. 1b.
Figure 2B:
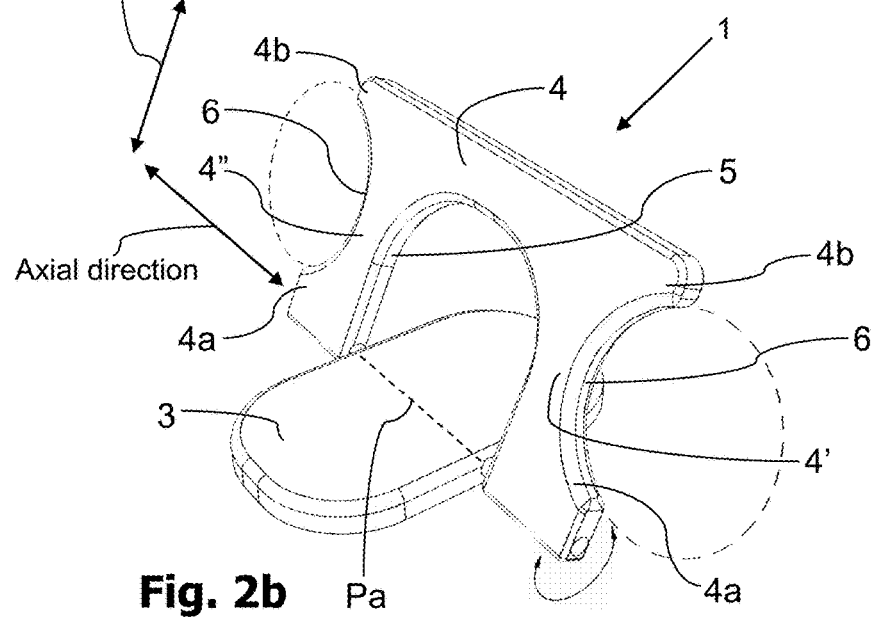

In a folded position of the first element 3 and the second element 4 which is shown in FIG. 2c and FIG. 4 the second element extends along the back of the mobile device 2, and in a pivoted away position of the first element 3 and the second element 4 relative to one another shown in FIG. 2b one, two or three fingers of a user's arm can be introduced into the finger receiving openings 5, 6, 6, so that the user can insert the fingers into the finger receiving openings 5, 6, 6 to hold the handle 1 and the mobile device by corresponding combination of the fingers.

In FIGS. 2c and 4 the first element 3 attachable to a back of the mobile device 2, and the second element 4 pivotally connected to the first element 3 are located substantially coplanar with one another. In FIGS. 2, 2a, 2b, 3, 5, 6 the second element 4 is pivoted away from the first element 3 to be located at an angle relative to the latter. In FIG. 5, as a result, the mobile device 2 can be supported on a supporting structure 7 at an angle relative to the latter.

Figure 7:
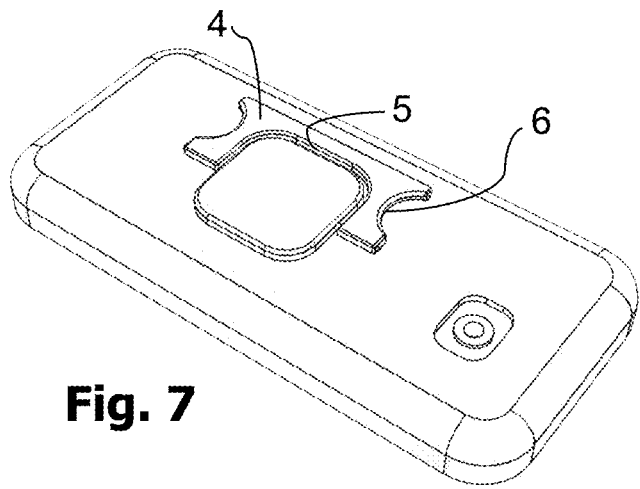
Figure 8:
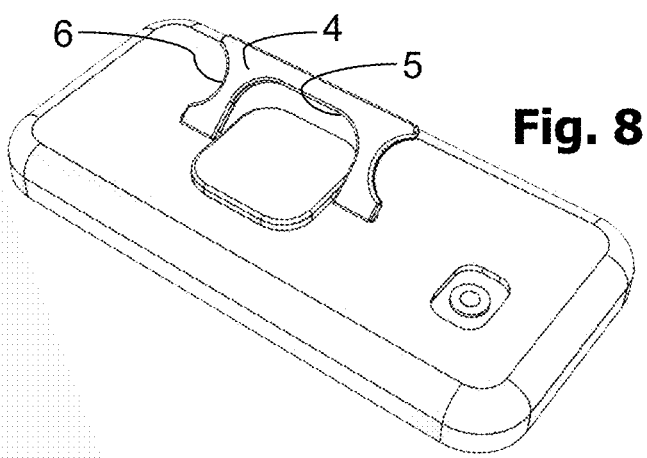
Figure 9:
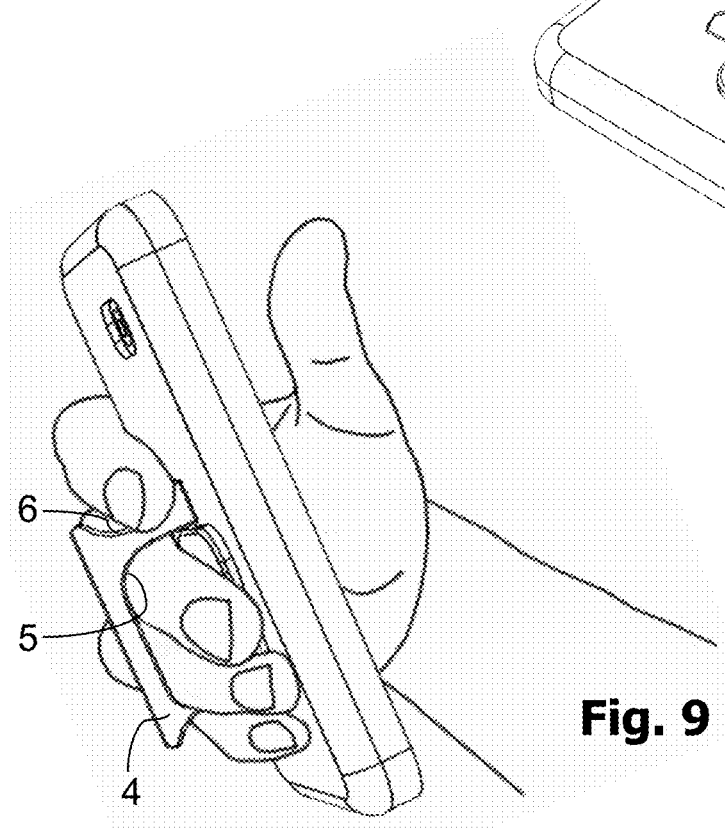

In the embodiment shown in FIGS. 7-9 the central finger receiving opening 5 of the second element 4 is wider so that it can accommodate two fingers of the user, and the two side finger receiving openings 6 accommodate two further fingers of the user. As a result, up to four fingers of the user can extend through the openings of the second element 4.

FIG. 10 shows a further embodiment of the present invention. Here the central finger receiving opening 5 of the second element 4 has a guiding groove 8 which is guided over a projection 9 of the first element 3 for guiding of the second element 4 during its pivoting relative to the first element 3. FIGS. 11-14 show the handle 1 as shown in FIG. 10 attached to the back of the mobile device 2, supported on the supporting structure 7, and supported by user's fingers.

In the further embodiment shown in FIG. 15 the first element 3 is provided with an elongated opening 10 in which the second element 4 is held in a pivotable manner and includes two supporting side openings 6 for fingers located at both sides of the latter, so that two fingers of the user can extend through two side finger receiving openings 6 as shown in FIG. 19. FIGS. 16-18 show the handle 1 as shown in FIG. 15 attached to the back of the mobile device 2 and supported on the supporting structure 7.

Figure 20:
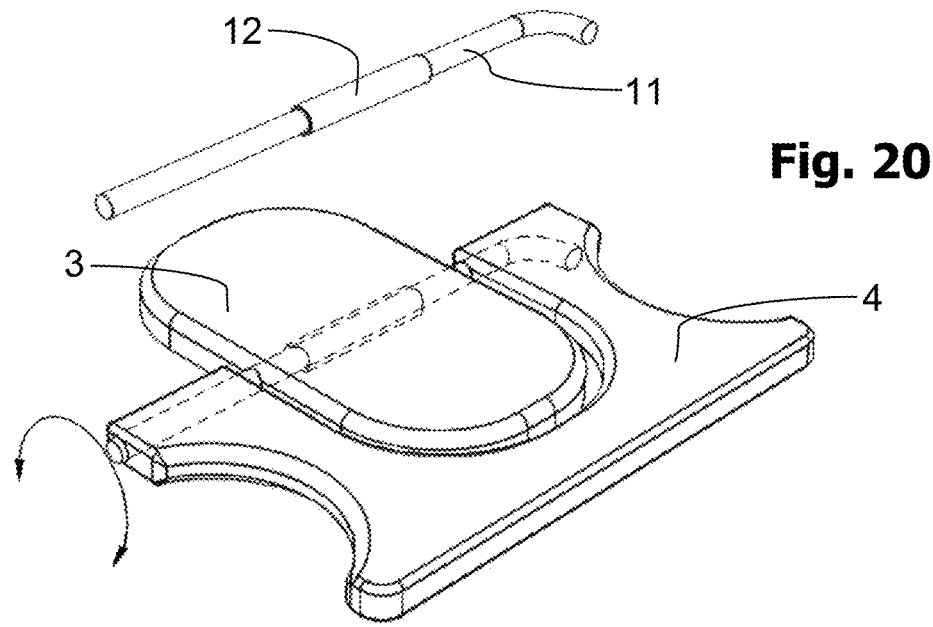
FIGS. 20-21 of the drawings are views showing an axle mechanism of the handle for holding mobile devices according to the present invention, allowing its different positioning to immovably retain the mobile device according to the present invention.
Figure 21:
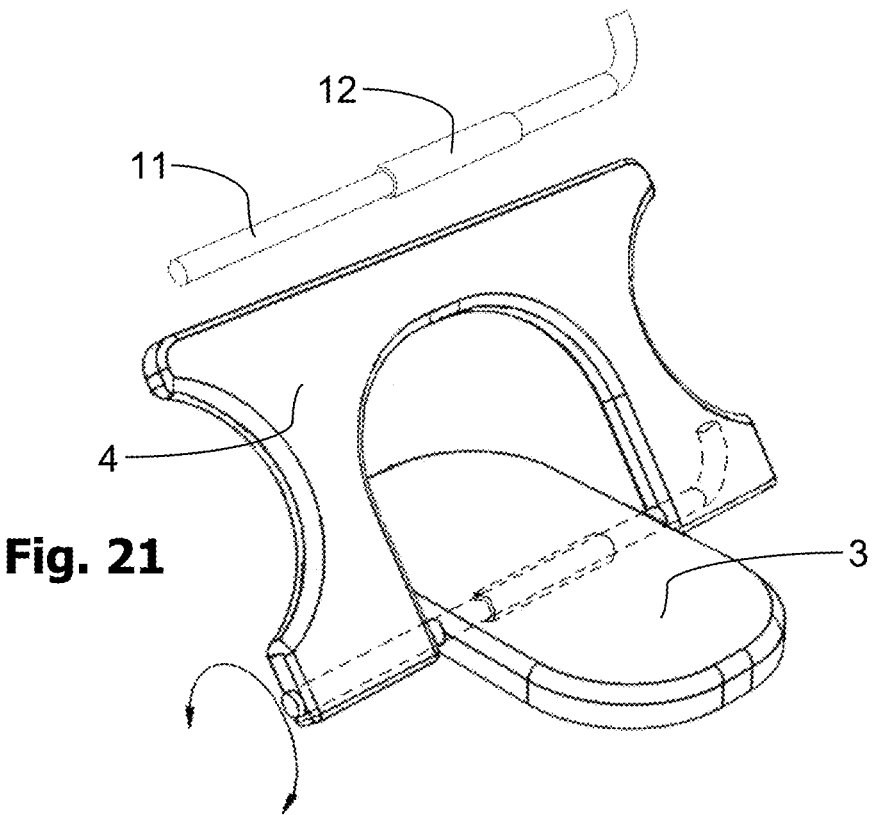

FIGS. 20 and 21 show one of possible pivotal connections of the first element 3 and the second element 4. Here a pin 11 extends through the first element 3 with an inhibiting element 12 and through the second element 4. In particular the straight portion of the pin 11 extends through an opening in the first element 3 with the inhibiting element 12 and bent portion of the pin 11 extends into the second element 4. It allows multiple relative inclined positions of the first element 3 and the second element 4 relative to one another, and thus the inclined positions of the mobile device 2 held by the handle 1 according to the present invention. The inhibiting element 12 of the pin 11 for pivotally connecting the second element 4 to the first element 3 makes it tightly turnable, so that the second element 4 can be pivoted relative to the first element 3 between a plurality of relative positions and retained immovably in each of the positions. This allows the handle 1 to hold the mobile device 2 so that it can be placed on a horizontal surface at an angle relative to the surface.

Figure 22:
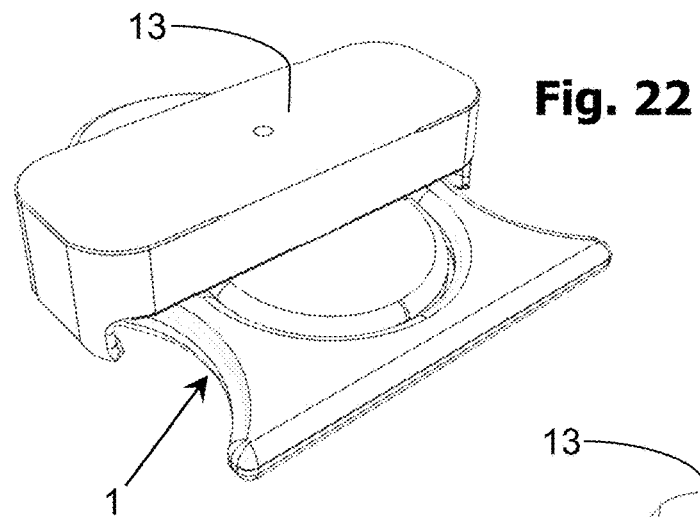
FIGS. 22-24 of the drawing are views showing the handle for holding mobile devices with means of connecting it to other surfaces according to the present invention.
Figure 23:
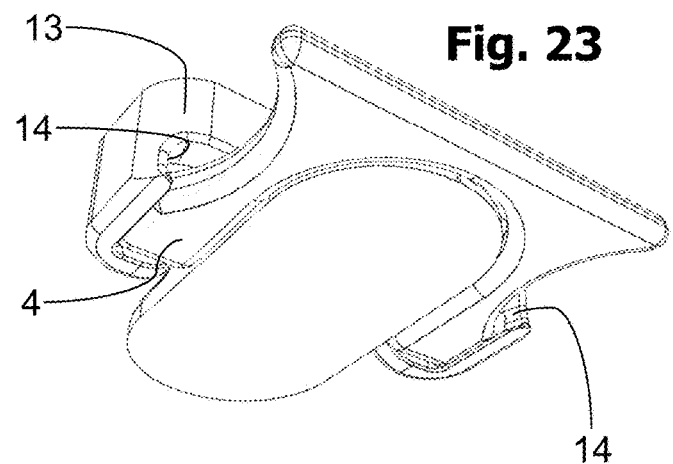
Figure 24:
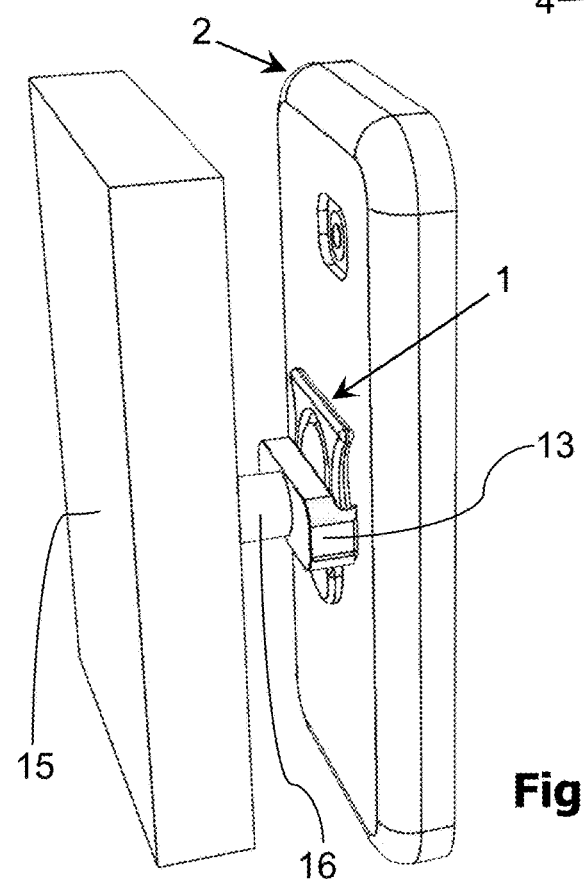

FIGS. 22-24 show one of possible means for attaching the handle 1 to an external element 15 with an attaching device 13. In the embodiment shown in FIG. 23 the second element 4 is attached to the attaching device 13 by sliding into a sliding groove 14. FIG. 24 shows the mobile device 2 attached to the external element 15 which is connected to an attaching device extender 16 that is attached to the attaching device 13 by the group of means consisting of adhesive, screws and bolts. The external element 15 is the group consisting of a car air vent, a shelf, a flat surface, and a curved surface.

The handle 1 for holding the mobile device 2 further comprises means for attaching the first element 3 to the back of the mobile device 2. The attaching means can be means selected from the group consisting of adhesive means, screws, and bolts, but also in other possible ways as well.

According to the present invention the first element 3 can be a permanent part of a cover of the mobile device 2 or of the mobile device.

Figure 25:
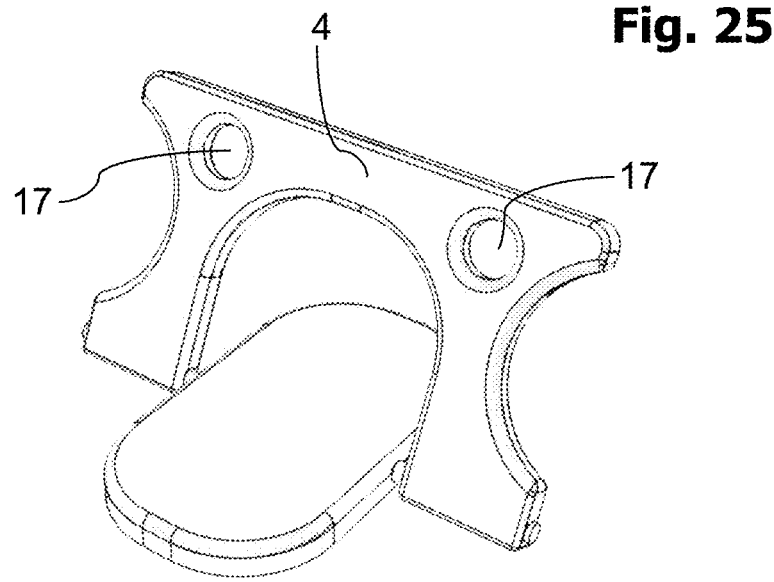
FIGS. 25-26 of the drawings are views showing the handle for holding mobile devices, according to still a further embodiment of the present invention.
Figure 26:
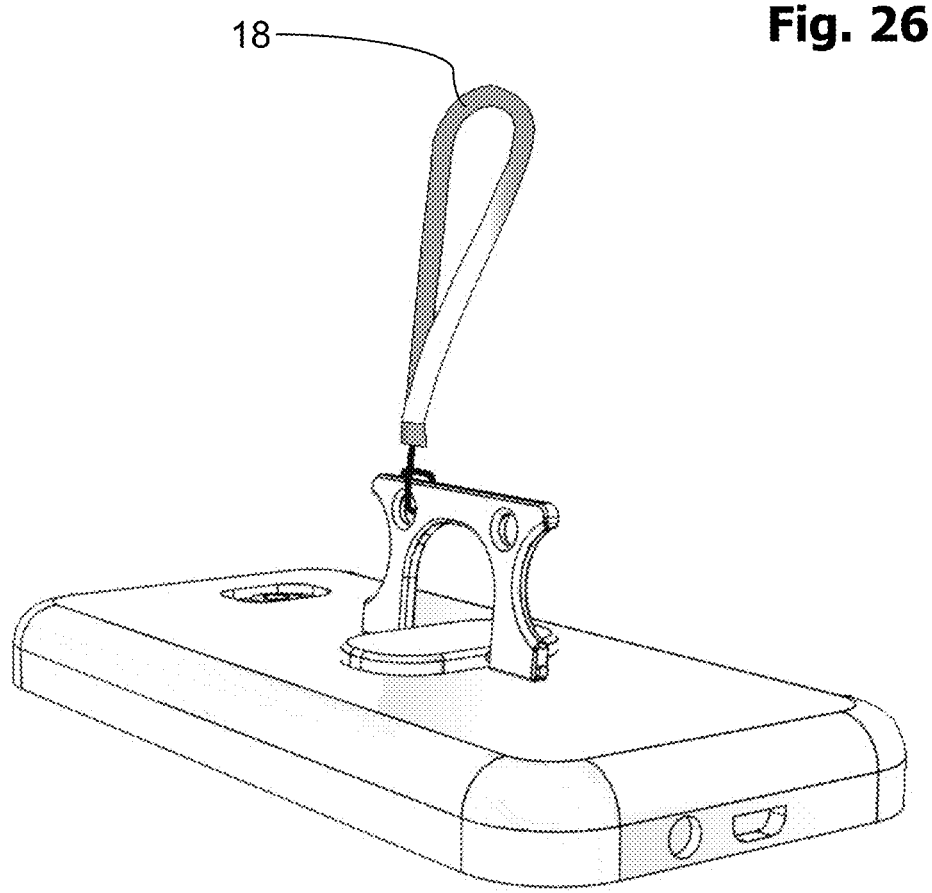

As can be seen from FIGS. 25-26 the handle 1 and in particular its second element 4 can be provided with at least one hole 17, or with two such holes 17 which are spaced from each other is direction which is parallel to the axial direction. The holes 17 can be used for passing a strap, a chain, a rope 18, or other similar elements to secure the handle 1 with the mobile device 2 to objects in order to prevent the same from falling or from being stolen. The holes can be also used for attaching decorative objects, such as for example charms or the like.

The present invention is not limited to the details shown since further modifications and structural changes are possible without departing from the spirit of the invention.

What is desired to be protected by Letters Patent is set forth in particular in the appended claims.

The invention claimed is:

1. A handle for holding a mobile device with at least one finger, comprising a first element attachable to a back of the mobile device; and a second element pivotally connected to the first element for pivoting around a pivot axis extending in an axial direction, wherein said second element includes at least two branches spaced from one another in a direction which is parallel to the axial direction and each having a finger receiving opening, wherein in a folded position of the first and second elements the second element extends along the back of the mobile device, while in a pivoted away position of the second element relative to the first element the first and second elements are located at an angle relative to one another, wherein each of the branches of the second element having a first portion located closer to the pivot axis and a second portion located farther from the pivot axis as considered in a direction which is transverse to the axial direction and formed so that when a finger of a user is introduced into said finger receiving opening of any of said branches it is surrounded by said first portion of said branch which first portion is located closer to the pivot axis and by said second portion of said branch which second portion is located farther from said pivot axis correspondingly from two sides including a side which is located closer to the pivot axis and a side which is located farther from the pivot axis as considered in the direction which is transverse to the axial direction, and wherein said first portion and said second portion of each of said branch are a mirror image of each other when viewed in the transverse direction.

2. The handle for holding a mobile device as defined in claim 1, further comprising means for attaching the first element to the back of the mobile device and selected from the group consisting of adhesive means, screws, and bolts.

3. The handle for holding a mobile device as defined in claim 1, further comprising means for pivotally connecting the second element to the first element so that the second element can be pivoted relative to the first element between a plurality of relative positions and retained immovably in each of the positions allowing the handle for holding a mobile device to keep the mobile device placed on a horizontal surface at an angle relative to the surface.

4. The handle for holding a mobile device as defined in claim 3, wherein said means for pivotally connecting the second element to the first element has a main portion formed as a pin inserted in one of the elements and a bent end portion inserted in the other of the elements.

5. The handle for holding a mobile device as defined in claim 1, wherein said second element is provided with at least one hole configured for receiving an element selected from the group consisting of a suspending element and a decorative element.

6. The handle for holding a mobile device as defined in claim 5, wherein said second element is provided with two such holes which are spaced from each other in a direction which is parallel to an axial direction and both configured for receiving the element selected from the group consisting of a suspending element and a decorative element.

7. The handle for holding a mobile device as defined in claim 1, wherein each of said portions of said branches is formed so that when a finger of a user is introduced in said finger receiving opening of each of said branches it is located at a distance from the pivot axis.

\* \* \* \* \*